Figure 1:
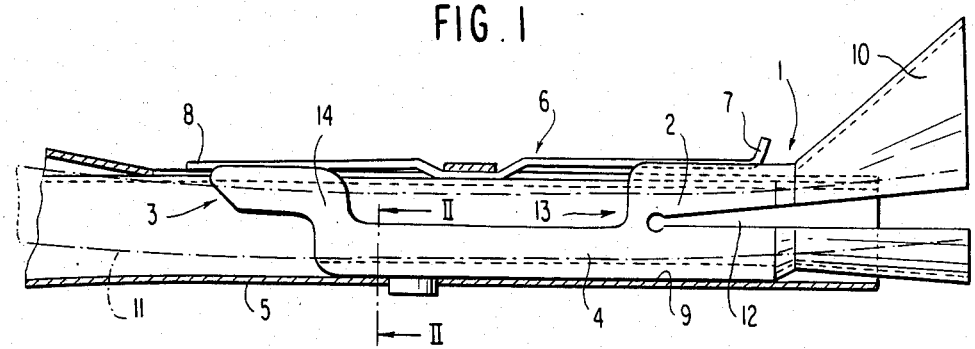

United States Patent [19]
Krügener et al.

[11] Patent Number: 4,650,250
[45] Date of Patent: Mar. 17, 1987

[54] GUIDE MEANS FOR A SUPPORT BAR OF A VERTICALLY SLIDABLE HEADREST

[75] Inventors: Rolf Krügener, Sindelfingen; Eberhard Faust, Stuttgart; Kurt Niethammer, Jettingen, all of Fed. Rep. of Germany

[73] Assignee: Daimler-Benz Aktiengesellschaft, Fed. Rep. of Germany

[21] Appl. No.: 785,754

[22] Filed: Oct. 9, 1985

[30] Foreign Application Priority Data

Oct. 12, 1984 [DE] Fed. Rep. of Germany ....... 3437476

[51] Int. Cl.⁴ .......................... A47C 1/10; A47C 7/38
[52] U.S. Cl. ..................................... 297/410; 248/414
[58] Field of Search ................. 297/391, 410; 248/414

[56] References Cited
U.S. PATENT DOCUMENTS 773,241  10/1904  Wilton .............................. 248/414 X
3,635,527  1/1972  Weber ................................. 297/410
4,111,484  9/1978  Jaeger ................................. 297/410
4,527,834  7/1985  Zyngier ............................... 297/410
4,560,202  12/1985  Koelle et al. ........................ 297/410

FOREIGN PATENT DOCUMENTS 2936423  3/1981  Fed. Rep. of Germany ...... 297/391

Primary Examiner—Peter A. Aschenbrenner
Assistant Examiner—Peter R. Brown
Attorney, Agent, or Firm—Barnes & Thornburg

[57] ABSTRACT

A guide means for a support bar of a vertically slidable headrest of which the two guide elements, made of resilient material and inserted mutually superposed at an interval in a guide rail, are in mutual communication by a web in a manner favorable for production and assembly and wherein a median section of the web serves as a further bracing point for the support bar in addition to the two guide elements.

5 Claims, 4 Drawing Figures

GUIDE MEANS FOR A SUPPORT BAR OF A VERTICALLY SLIDABLE HEADREST

The invention relates to a guide means for a support bar of a vertically slidable headrest, consisting of two guide elements made of resilient material housed mutually superposed at an interval in a guide rail, which are under pressure from the ends of a leaf spring braced against the guide rail towards the floor of the guide rail, and against which the support bar is braced, being secured against accidental sliding.

A guide means of this type, consisting of two mutually independent parts wherein the upper guide element is further provided with an additional brake element is known from German Offenlegungsschrift No. 2,512,147. The expense for production and assembly is high due to the large number of components. Where it is required to modify the vertical position of the headrest, the latter must first of all be moved away from the brake element in order to reduce the braking effect. An adjustment while travelling is therefore scarcely possible.

It is an object of the invention to provide a guide means for a vertically slidable headrest which overcomes the difficulties encountered with the prior art.

It is another object of the invention to produce a guide means which affords reduction in expense for production and assembly.

It is another object of the invention to develop a guide means whereby it is unnecessary to reduce the braking action by particular measures before initiating an adjusting movement.

It is another object of the invention to provide a guide means for a support bar of a vertically slidable headrest having two guide elements made of resilient material housed mutually superposed at an interval in a guide rail which elements are compressed by the ends of a leaf spring braced against the guide roller rail towards a floor of the guide rail and against which the support bar is braced against accidental sliding.

It is another object of the invention to produce a guide means for a support bar of a vertically slidable headrest wherein two guide elements are in mutual communication by way of a web contacting a floor of a guide rail, the median section of the web forming a further bracing point for a support bar.

By the third bracing point on the web, an adequate retaining force is generated in conjunction with the leaf spring, which can be overcome by a simple upward or downward movement of the headrest and without any superimposed pivoting movement. It is therefore possible to accomplish a manual adjusting movement even while travelling. The use of such an adjusting device, operated by auxiliary power or remotely, presents no difficulties.

The web may, in an inexpensive manner, be connected integrally to the guide elements.

The process of inserting the support bar is simplified if the web is provided with a channel which forms the continuation of a wall region of the bore in the upper guide element.

In a manually adjustable headrest, wherein the position reached is required to be secured against accidental displacement by an adequate braking action, it is advantageous if the channel wall on the web side extends upwards approximately to half the diameter of the bore of the lower guide element.

In order to use an adjusting device actuated by auxiliary power or be remote means, in which a self-locking device is present in the transmission path, it is sufficient if the channel wall on the web side projects only slightly above the floor of the channel. This renders the web region flexible and reduces considerably the braking action originating from the guide means, so that the required adjusting force is greatly reduced.

As a further development of the invention, the lower guide element is constructed as a bearing shell staggered vertically relative to the web, which leads to a reduction in weight without impairing the functional efficiency. This moreover achieves a deliberate stressing of this bearing element by the leaf spring.

This also applies in the case of the upper guide element, if the latter is slit, in the region of its bore, starting from a terminal introduction funnel for the support bar, by an incision oriented approximately parallel to the web and extending at least over two-thirds of the length of the bore.

Figure 3:
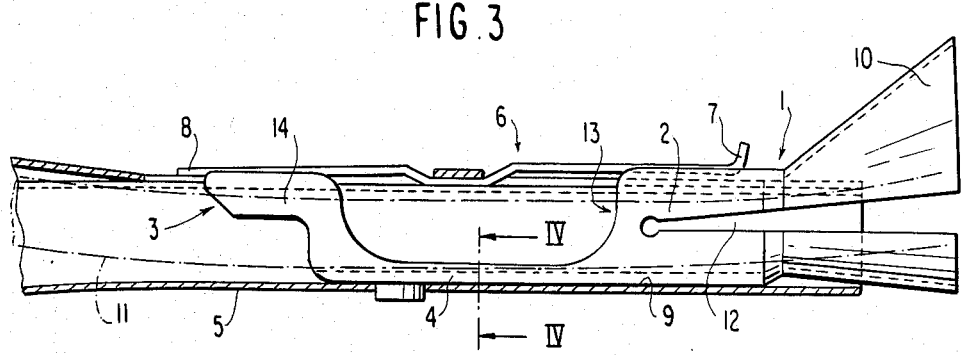
Figure 2:
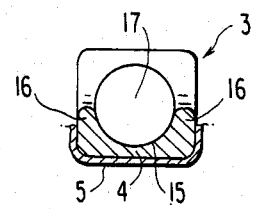
Figure 4:
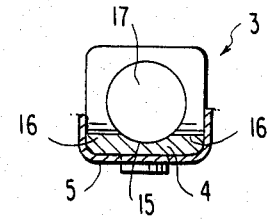

These and other objects, features, and advantages of the present invention will become more apparent from the following description when taken in connection with the accompanying drawing which shows, for the purposes of illustration only, plural embodiments in accordance with the present invention, and wherein:

FIG. 1 shows a first guide means serving to house the support bar of a manually adjustable headrest and resting in a guide rail, FIG. 2 shows a section along the line II—II in FIG. 1, FIG. 3 shows a second embodiment, based upon the arrangement according to FIG. 1, with a guide means used in combination with a headrest adjustable by auxiliary power or remotely, and FIG. 4 shows a section along the line IV—IV in FIG. 3.

Referring now to the drawings wherein like reference numerals are used to designate like parts and more particularly to FIGS. 1 and 3, a guide means 1 consisting of resilient material, which consists of an upper guide element 2 and a lower guide element 3, the two guide elements 2 and 3 being mutually integrally connected via a web 4, is housed by a guide rail 5, which is equipped, in manner not shown, with a hat-shaped profile open towards a seat occupant. A leaf spring 6 in contact with the guide rail 5 presses by its ends 7 and 8 against the guide elements 2 and 3, so that the guide means 1 is braced against the floor 9 of the guide rail 5 via the web 4.

The upper guide element 2 terminates in an introduction funnel 10 for a support bar 11, illustrated in chain-dotted lines, of a headrest, not shown, and is provided, starting from the commencement of the funnel, with an incision 12 which is oriented approximately parallel to the web 4 and extends at least over two-thirds of the length of the bore 13 in the guide element 2. The wall section of the guide element 2 which still remains adjacent to the incision 12 assumes the function of a hinge, so that the upper half of the guide element 2 can spring when stressed by the end 7 of the leaf spring 6.

The lower guide element 3 acquires certain springy properties in that it is constructed as a bearing shell 17, FIGS. 2 and 4, staggered vertically relative to the web 4. For the introduction of the support bar 11 in the correct position, the web 4 is equipped with a channel 15 (FIGS. 2 and 4), which extends in prolongation of a wall region of the bore 13.

So far there is no difference between the exemplary embodiments according to FIGS. 1 and 3, so that the same reference numerals can also be used for similar parts. As FIG. 2 particularly shows, a channel wall 16 adjacent to the channel 15 on both sides projects upwards to approximately half the diameter of the bore 17 of the lower guide element 3, so that the web 4 undergoes a considerable stiffening, which, in cooperation with the leaf spring 6, creates an adequate braking action for the support bar 11 of a manually vertically adjustable headrest.

This braking action can be reduced by reducing the height of the channel wall 16. In the case of a headrest slidable by auxiliary power or remotely, in which a retaining force is generated by gear transmission which prevents any accidental adjustment of the vertical position of the headrest, an arrangement according to FIG. 4 may be chosen. As may be seen, in this case the channel wall 16 overhangs the floor of the channel 15 only slightly, so that the web 4 acquires resilient characteristics. It is thereby possible to reduce the drive power and to employ inexpensive drive sources.

While we have shown and described plural embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A guide means for a support bar of a vertically slidable headrest, having upper and lower guide elements made of resilient material housed mutually superposed at an interval in a guide rail, and having bores therein through which said support bars pass said guide elements being under pressure by the ends of a leaf spring which is in contact with the guide rail and which braces the guide elements towards a rear portion of the guide rail against the support bar to frictionally maintain the support bar in a selected vertical position within the guide means, the guide means including means to secure the upper and lower guide elements against accidental sliding, comprising a web means mutually integrally connecting said upper and lower guide elements and engaging the rear portion of the guide rail, a median section of the web means having a channel therealong which extends from said bores for seating the support rod therein for forming a further bracing for the support bar.

2. A guide means according to claim 1, wherein the channel walls at the side of said web extend from the floor of the guide rail approximately to half the diameter of said bore of the lower guide element.

3. A guide means according to claim 1, wherein the channel walls at the sides of the web extend upwardly from the rear portion of the channel substantially less than half the diameter of the lower guide element.

4. A guide means according to claim 1, wherein the lower guide element is constructed as a bearing shell staggered horizontally relative to the web.

5. A guide means according to claim 1, wherein the upper guide element in the region of said bore comprises a slot, starting from a terminal introduction funnel for the support bar by an incision oriented approximately parallel to the web and extending at least over two-thirds of the length of the bore.

* * * * *